(12) United States Patent
Noh et al.

(10) Patent No.: US 12,531,432 B2
(45) Date of Patent: Jan. 20, 2026

(54) ELECTRONIC DEVICE INCLUDING BATTERY, OPERATION METHOD THEREOF, AND STORAGE MEDIUM THEREFOR

(71) Applicant: SAMSUNG ELECTRONICS CO., LTD., Suwon-si (KR)

(72) Inventors: Hyunjin Noh, Suwon-si (KR); Jongwoo Kim, Suwon-si (KR); Sungyong Bang, Suwon-si (KR); Hakryoul Kim, Suwon-si (KR); Jongkyu Lee, Suwon-si (KR); Mooyoung Kim, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 504 days.

(21) Appl. No.: 17/989,001

(22) Filed: Nov. 17, 2022

(65) Prior Publication Data

US 2023/0187961 A1 Jun. 15, 2023

Related U.S. Application Data

(63) Continuation of application No. PCT/KR2022/017666, filed on Nov. 10, 2022.

(30) Foreign Application Priority Data

Dec. 9, 2021 (KR) .......................... 10-2021-0175367
Feb. 11, 2022 (KR) .......................... 10-2022-0018446

(51) Int. Cl.
*H02J 7/00* (2006.01)
*H04M 19/00* (2006.01)

(52) U.S. Cl.
CPC ...... *H02J 7/007192* (2020.01); *H02J 7/0047* (2013.01); *H02J 7/00712* (2020.01); *H04M 19/00* (2013.01)

(58) Field of Classification Search
CPC ............... H02J 7/007192; H02J 7/0047; H02J 7/00712; H02J 7/00; H04M 19/00; H04M 1/02; H01M 10/48
See application file for complete search history.

(56) References Cited

U.S. PATENT DOCUMENTS 9,431,848 B2 * 8/2016 Lee ................... H02J 7/007192
10,566,813 B2 * 2/2020 Jo ....................... H02J 7/00712
(Continued)

FOREIGN PATENT DOCUMENTS

EP 0864196 B1 9/2003
EP 3 840 104 A1 6/2021
(Continued)

OTHER PUBLICATIONS

Extended European Search Report dated Nov. 21, 2024 for EP Application No. 22904491.2.
(Continued)

*Primary Examiner* — Dhaval V Patel
(74) *Attorney, Agent, or Firm* — NIXON & VANDERHYE P.C.

(57) ABSTRACT

An electronic device may include a battery, a charging circuit, at least one sensor, a plurality of temperature sensors disposed respectively at different positions, at least one processor operatively coupled to the battery, the charging circuit, the at least one sensor, or the plurality of temperature sensors, and memory. The memory storing instructions which are configured to, when executed, cause the electronic device to, measure temperature values at intervals of a predefined period using the plurality of temperature sensors during charging, identify a heat state based on at least in part of the measured temperature values, identify a user contact state using the at least one sensor, and control charging power for the battery through the charging circuit based on
(Continued)

the heat state and the user contact state. Various other embodiments are also available.

20 Claims, 9 Drawing Sheets

(56) References Cited

U.S. PATENT DOCUMENTS

| | | | | |
|---|---|---|---|---|
| 11,056,903 | B2 * | 7/2021 | Lim | ............... H02J 7/00036 |
| 11,070,074 | B2 | 7/2021 | Yi et al. | |
| 11,381,100 | B2 * | 7/2022 | Yu | ............... H02J 7/0068 |
| 12,163,847 | B2 * | 12/2024 | Hino | ............... G01K 3/06 |
| 2008/0030171 | A1 | 2/2008 | Villefrance et al. | |
| 2018/0136051 | A1 | 5/2018 | Ishii | |
| 2018/0342886 | A1 | 11/2018 | Jo et al. | |
| 2019/0155347 | A1 | 5/2019 | Ishii et al. | |
| 2019/0157892 | A1 | 5/2019 | Kuroda et al. | |
| 2019/0334354 | A1 | 10/2019 | Mizukami et al. | |
| 2020/0293090 | A1 | 9/2020 | Kanda | |
| 2020/0335995 | A1 | 10/2020 | Hasegawa | |
| 2021/0240165 | A1 | 8/2021 | Noh et al. | |
| 2021/0384749 | A1 | 12/2021 | Liao | |
| 2021/0399568 | A1 | 12/2021 | Huang et al. | |

FOREIGN PATENT DOCUMENTS

| | | |
|---|---|---|
| JP | 2008-17562 | 1/2008 |
| JP | 2014-131452 A | 7/2014 |
| JP | 2014-212594 A | 11/2014 |
| JP | 2018-81467 | 5/2018 |
| JP | 2019-097310 A | 6/2019 |
| KR | 20-2008-0002904 | 7/2008 |
| KR | 10-2009-0048712 | 5/2009 |
| KR | 10-2019-0127306 A | 11/2019 |
| KR | 10-2086302 | 3/2020 |
| WO | 2018/012055 | 4/2019 |
| WO | 2020/026536 | 8/2020 |
| WO | WO 2020/168892 A1 | 8/2020 |

OTHER PUBLICATIONS

International Search Report dated Feb. 20, 2023 for PCT/KR2022/017666.
PCT Written Opinion Feb. 20, 2023 for PCT/KR2022/017666.
European Office Action (Communication pursuant to Article 94(3) EPC dated May 7, 2025 issued in European Patent Application No. 22904491.2, 5 pp.

* cited by examiner

ELECTRONIC DEVICE INCLUDING BATTERY, OPERATION METHOD THEREOF, AND STORAGE MEDIUM THEREFOR

CROSS-REFERENCE TO RELATED APPLICATIONS

This application is a continuation of International Application No. PCT/KR2022/017666, filed on Nov. 10, 2022, designating the United States, in the Korean Intellectual Property Receiving Office, and claiming priority to Korean Patent Application No. 10-2021-0175367, filed on Dec. 9, 2021, in the Korean Intellectual Property Office, and to Korean Patent Application No. 10-2022-0018446, filed on Feb. 11, 2022, in the Korean Intellectual Property Office, the disclosures of which are all hereby incorporated by reference herein in their entireties.

TECHNICAL FIELD

Various example embodiments relate to an electronic device including a battery, and/or operation method thereof, and/or a storage medium therefor.

BACKGROUND

Because an electronic device processes a large amount of data and consumes much power to perform various functions, the electronic device is equipped with a large-capacity battery. Due to the demand for fast charging of the large-capacity battery, the capacity W of a charging device for supplying power is also gradually increasing.

As the use time of the electronic device gradually increases, the resulting increase of data throughput inevitably increases current consumption. As power is supplied to other components of the electronic device, much heat may be generated from the battery, and thus the temperature of the electronic device may rise. Moreover, when the electronic device is used while coupled to a high-power charging device, heat may be generated during charging.

SUMMARY

An increase in the amount of heat may cause the phenomenon that heat is generated on a surface of the electronic device as well as around the battery. For example, a user uses the electronic device while holding it, and when the battery or its surroundings is overheated, the heat may cause discomfort to the user using the electronic device, and further, low-temperature burns due to skin contact.

Heat control may be performed in the electronic device to reduce or prevent heat generation during charging. When the electronic device performs heat control in consideration of the risk of low-temperature burns to prevent or reduce occurrence of an over-temperature situation, for example, when the electronic device controls heat only to a temperature set by a manufacturer or to a unilaterally given temperature, the overall performance of the electronic device may be degraded, and heat control optimized for the user may be difficult.

Various example embodiments may provide an electronic device including a battery, an operation method thereof, and/or a storage medium therefor.

According to various example embodiments, an electronic device may include a battery, a charging circuit, at least one sensor, a plurality of temperature sensors disposed respectively at different positions, at least one processor operatively coupled, directly or indirectly, to at least one of the battery, the charging circuit, the at least one sensor, or the plurality of temperature sensors, and memory. The memory may store instructions which are configured to, when executed, cause the electronic device to, measure temperature values at intervals of a predefined period using the plurality of temperature sensors during charging, identify a heat state based on at least in part of the measured temperature values, identify a user contact state using the at least one sensor, and control charging power for the battery through the charging circuit based on the heat state and the user contact state.

According to various example embodiments, a method of operating an electronic device may include, measuring temperature values at intervals of a specified period using a plurality of temperature sensors during charging, identifying a heat state based on at least in part of the measured temperature values, identifying a user contact state using at least one sensor, and controlling charging power for a battery based on the heat state and the user contact state.

According to various example embodiments, a storage medium may store instructions configured to, when executed by at least one processor of an electronic device, cause the electronic device to perform at least one operation. The at least one operation may include, measuring temperature values at intervals of a predefined period using a plurality of temperature sensors during charging, identifying a heat state based on at least in part of the measured temperature values, identifying a user contact state using at least one sensor, and controlling charging power for a battery based on the heat state and the user contact state.

According to various example embodiments, as an electronic device adaptively controls heat generation according to a charging situation and a user contact state during charging, performance limitations caused by heat generation may be minimized, and thus both active operation performance and stable charging may be ensured.

According to various example embodiments, skin contact-incurred low-temperature burns may be prevented or reduced by enabling heat control in correspondence with a user contact state during charging of the electronic device.

It will be appreciated by those skilled in the art that the effects that can be achieved with the disclosure are not limited to what has been particularly described hereinabove and other advantages of the disclosure will be more clearly understood from the following detailed description taken in conjunction with the accompanying drawings.

BRIEF DESCRIPTION OF THE DRAWINGS

The above and other aspects, features, and advantages of certain embodiments will be more apparent from the following detailed description, taken in conjunction with the accompanying drawings, in which.

In connection with the description of the drawings, the same or similar reference numerals may be used to denote the same or similar components.

DETAILED DESCRIPTION

Figure 1:
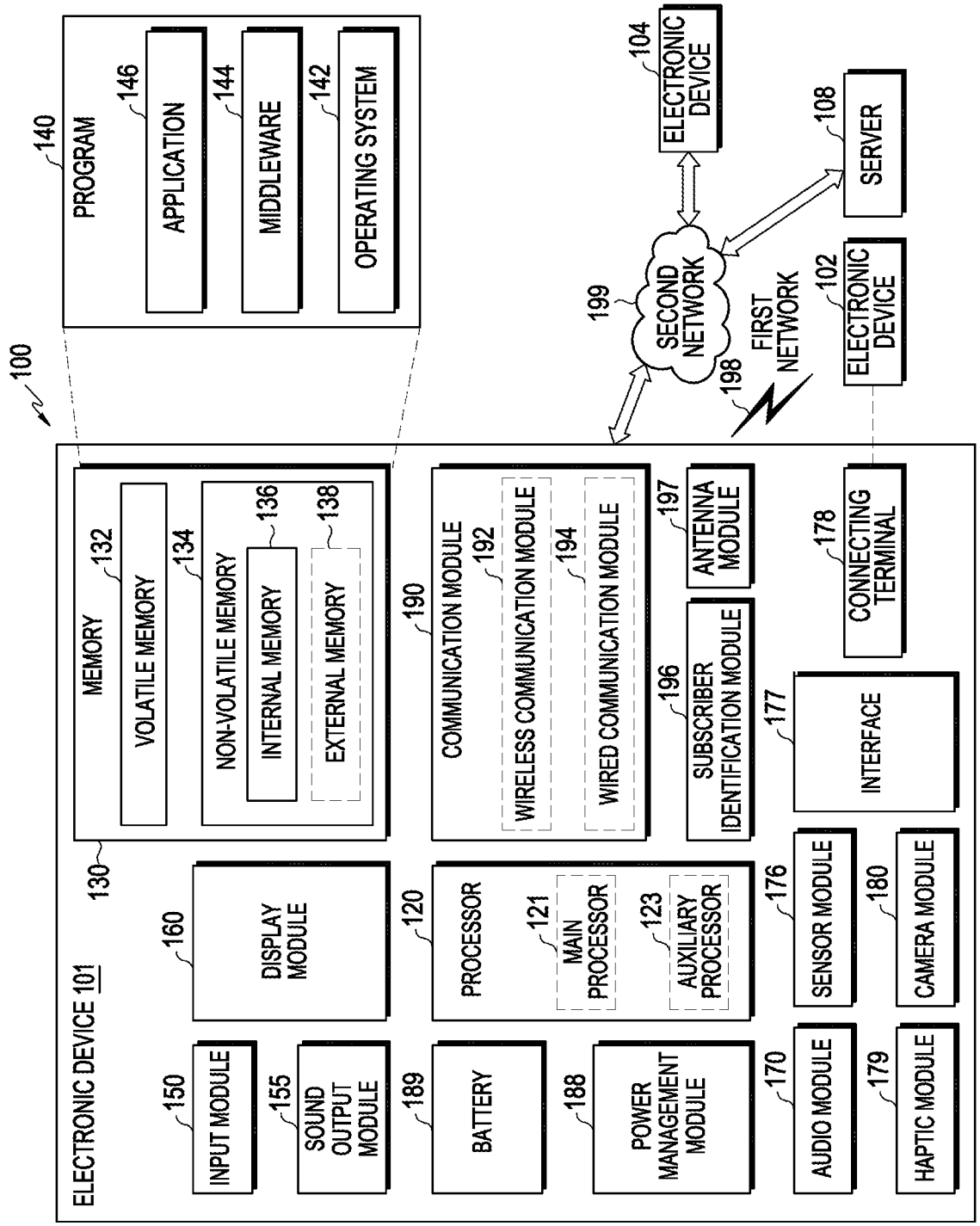
FIG. 1 is a block diagram illustrating an electronic device in a network environment according to various example embodiments.

FIG. 1 is a block diagram illustrating an electronic device in a network environment according to various embodiments. Referring to FIG. 1, an electronic device 101 in a network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thererto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full 5 dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

Antenna module 197 may transmit or receive a signal or power to or from the outside (e.g., the external electronic device) of the electronic device 101. According to an embodiment, antenna module 197 may include an antenna including a radiating element composed of a conductive material or a conductive pattern formed in or on a substrate (e.g., a printed circuit board (PCB)). According to an embodiment, antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of antenna module 197.

According to various embodiments, antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example.

The electronic device 101 may provide ultra low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

An exemplary electronic device 201 according to various embodiments will be described below.

Figure 2:
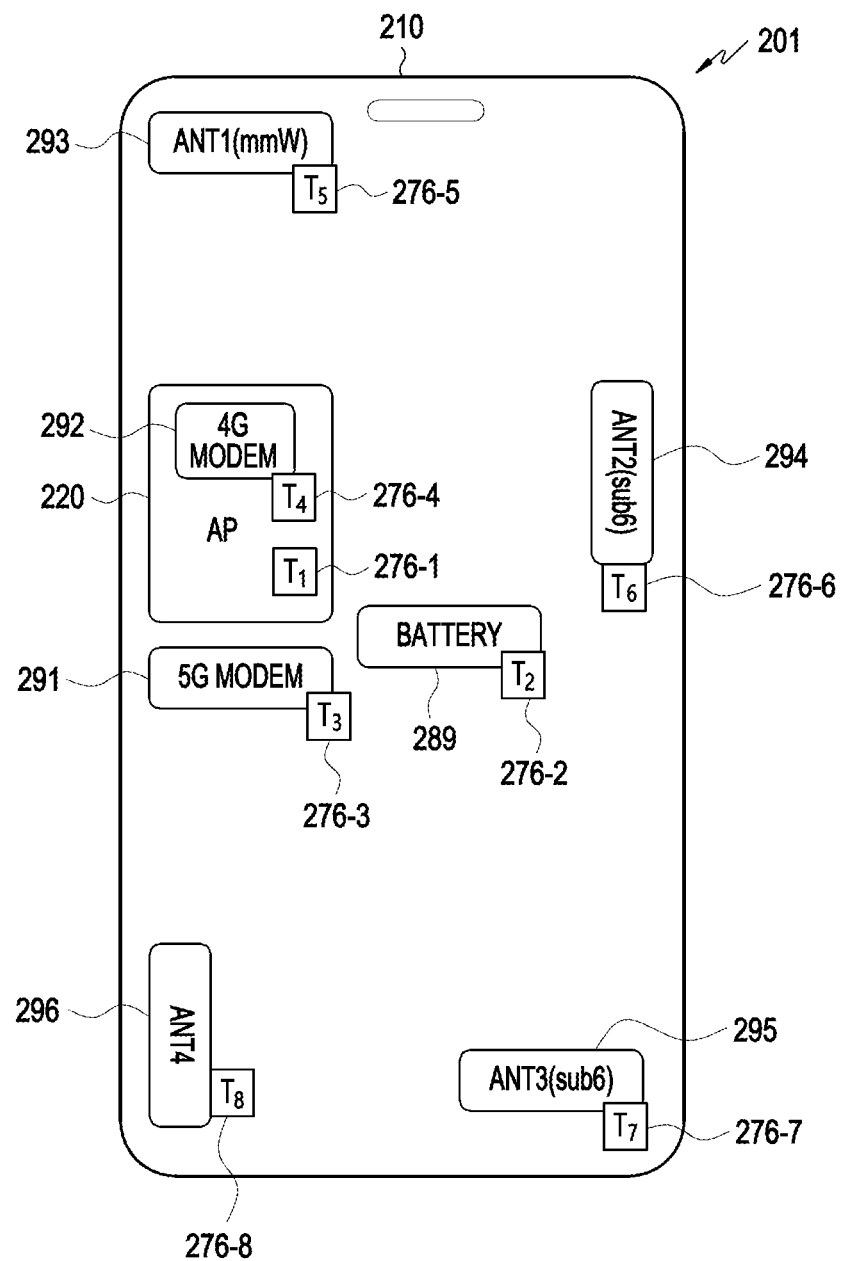
FIG. 2 is a diagram illustrating components corresponding to heat sources and temperature sensors among components of an electronic device according to various example embodiments.

FIG. 2 is a diagram illustrating components corresponding to heat sources and temperature sensors among components of an electronic device according to various embodiments.

Referring to FIG. 2, the electronic device 201 (e.g., the electronic device 101 of FIG. 1) according to an embodiment may have various components mounted inside a housing 210. Among the components, components corresponding to heat sources may include a processor AP 220, a battery 289, a first communication circuit (e.g., a $5^{th}$ generation (5G) modem) 291, a second communication circuit (e.g., a $4^{th}$ generation (4G) or long term evolution (LTE) modem) 292, a first antenna module ANT1 (mmWave) 293, a second antenna module ANT2 (sub6) 294, a third antenna module ANT3 (sub6) 295, and a fourth antenna module ANT4 296. Each antenna module here comprises at least one antenna.

According to an embodiment, more components other than the above-described components may be included in the housing 210 of the electronic device 201, and the components corresponding to the heat sources may also include some of the processor AP 220, the battery 289, the first communication circuit (e.g., the 5G modem) 291, the second communication circuit (e.g., the 4G or LTE modem) 292, the first antenna module ANT1 (mmWave) 293, the second antenna module ANT2 (sub6) 294, the third antenna module ANT3 (sub6) 295, and the fourth antenna module ANT4 296, or may further include components corresponding to other heat sources.

According to an embodiment, the electronic device 201 may include temperature sensors 276-1 to 276-8 at positions adjacent, directly or indirectly, to the components 220, 289, 291, 292, 293, 294, 295, and 296 corresponding respectively to the heat sources, to respectively sense temperatures associated with the components 220, 289, 291, 292, 293, 294, 295, and 296 corresponding to the heat sources, According to an embodiment, the electronic device 201 may obtain a heat temperature of the electronic device 201 based on a temperature value sensed by at least one of the temperature sensors 276-1 to 276-8. When the electronic device 201 is used while coupled, directly or indirectly, to a charging device, heat may be generated during charging and transferred to a surface of the electronic device 201, resulting in low-temperature burns caused by skin contact. For example, the surface of the electronic device 201 may be heated by the components corresponding to the heat sources according to an operating condition of the electronic device 201 during charging. The heat may cause discomfort to a user using the electronic device 201, and overheat may damage internal components or degrade performance.

Therefore, it may be necessary to efficiently control heat generation of the electronic device 201 in a skin contact state during charging. According to various embodiments, when the electronic device 201 is used during charging, heat generation of the electronic device 201 may be controlled by adjusting charging power for the battery according to whether the user uses the electronic device 201 in contact with the electronic device 201.

According to an embodiment, the processor AP 220 may perform heat control during charging based on various conditions such as a user contact state and an operation condition of the electronic device 201 as well as a heat state of the electronic device 201. For example, when the user uses the electronic device 201, the processor AP 220 may control heat by adjusting charging power for the battery adaptively according to a degree to which the user contacts the electronic device 201 (e.g., a contact area between the user and the electronic device 201), while using the electronic device 201. Accordingly, as the electronic device 201 controls charging power on a use scenario basis, such as a charging state and a user contact or non-contact during charging, optimized heat control is possible, performance limitations imposed by heat may be reduced, and both active operation performance and stable charging may be ensured.

Figure 3:
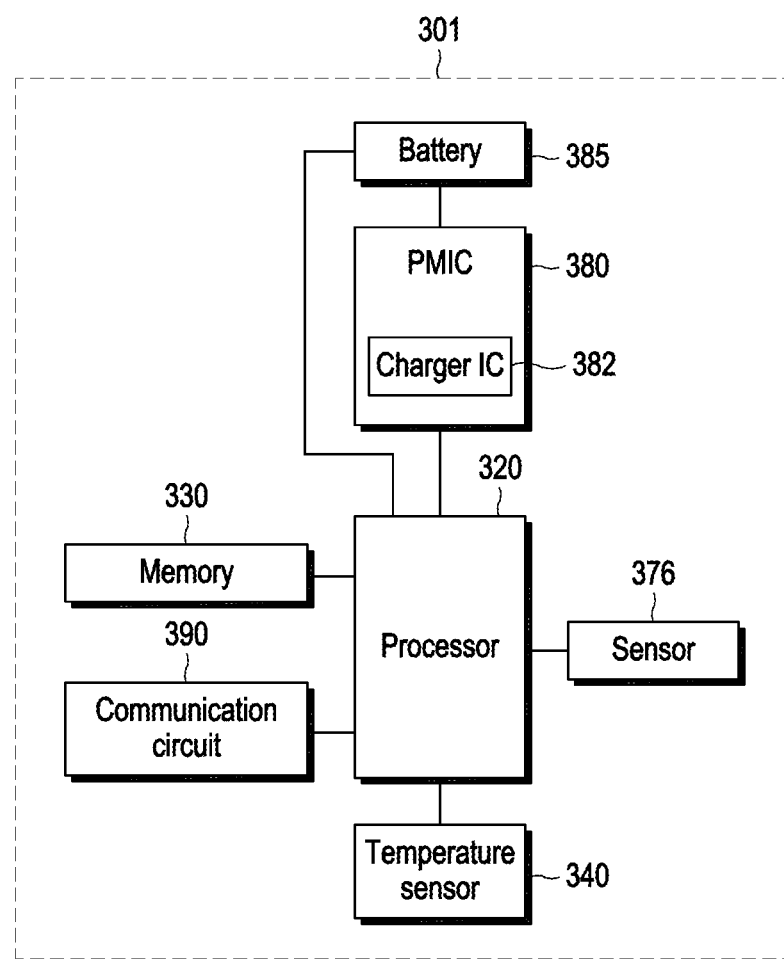
FIG. 3 is an internal block diagram illustrating an electronic device that performs heat control during charging according to various example embodiments.

FIG. 3 is an internal block diagram illustrating an electronic device that performs heat control during charging according to various embodiments.

Referring to FIG. 3, an electronic device 301 may have various components mounted inside a housing, and include, for example, the whole or part of the electronic device 101 illustrated in FIG. 1. The electronic device 301 may include one or more processors 320 (e.g., an AP), memory 330, a temperature sensor 340, a sensor 376, a power management integrated circuit (PMIC) 380, a battery 385, and a communication circuit 390.

According to an embodiment, the electronic device 301 may not be provided with at least one of the components or may additionally include other components. Although the term "circuitry (or circuit)" is used for the electronic device 301, it may be replaced with terms such as "— module", "— unit", and "— group".

Referring to FIG. 3, the electronic device 301 may be coupled, directly or indirectly, to an external device through a connector (not shown). When the electronic device 301 is electrically coupled, directly or indirectly, to the external device through the connector, power may be received from the external device.

According to various embodiments, a charging circuit of the electronic device 301 may include the PMIC 380. According to an embodiment, the charging circuit may be a separate component different from the processor 320. According to various embodiments, the PMIC 380 (or a charger IC 382) may control the voltage of power supplied to each component of the electronic device 301. The PMIC 380 may output a predetermined voltage. The PMIC 380 may receive power from an external device (e.g., a charger, a battery pack) that supplies external 5 power through a connector, output the predetermined voltage, and charge the electrically coupled battery 385. While FIG. 3 illustrates an implementation example in which the charger IC 382 is included in the PMIC 380, the charger IC 382 may be implemented separately from the PMIC 380 to supply and manage power to the battery 385 and the PMIC 380.

According to various embodiments, the processor 320 may control an operation of the electronic device 301 and/or a signal flow between components of the electronic device 301, and may perform a data processing function for processing data. When the processor 320 is coupled, directly or indirectly, with an external device, the processor 320 may recognize the coupling through an interrupt signal line of a connector. According to an embodiment, the processor 320 may identify a value sensed through the connector, and identify whether the processor 320 has been coupled (or attached) to or decoupled (or detached) from the external device according to the sensed value. According to an embodiment, the processor 320 may identify whether it has been coupled, directly or indirectly, to the external device through the connector, and identify initial power that the coupled external device is capable of supplying. The processor 320 may start charging the battery 385 based on the input initial power.

According to various embodiments, the memory 330 may be electrically coupled, directly or indirectly, to the processor 320, and store various types of information and programs required for controlling a heat temperature of the electronic device 301 during charging according to various embodiments. For example, the programs may include a routine for detecting a connection, direct or indirect, to an external device, for charging, a routine for charging according to the external device, a routine for checking heat generation of components corresponding to heat sources during charging, a routine for predicting the degree of heat generation when abnormal heat equal to or higher than a threshold temperature value is generated, a routine for determining a final control level (or a control amount) by reflecting the user's use (e.g., a user contact state and an operation state) of the electronic device 301 in the predicted degree of heat generation, and a routine for controlling charging power according to the final control level.

In addition, instructions may be prestored in the memory 330 to provide a notification through a display of the electronic device 301 and adaptively change the charging power of the electronic device 301 according to a user contact state, when heat equal to or higher than the threshold temperature is generated during charging. Control of the charging power for the battery 385 may amount to control of a charging current applied to the battery 385. While the term "charging power" is used for illustrative purposes to describe various embodiments, the "charging power" may be used alternatively to/interchangeably with any one of "current", "voltage", "power", or "impedance".

According to various embodiments, the communication circuit 390 may be the same as a communication circuit described before in relation to the communication module 190 of FIG. 1. According to an embodiment, the communication circuit 390 may include a first communication circuit and a second communication circuit or/and a third communication circuit. According to an embodiment, the first communication circuit may communicate through at least part of an antenna module in a first communication scheme, and the second communication circuit may communicate through at least part of the antenna module in a second communication scheme. According to an embodiment, the first communication scheme may be based on a 5G (or new radio (NR) communication protocol, and the second communication scheme may be based on a 4G (or LTE) communication protocol. According to an embodiment, the third communication circuit may be a short-range wireless communication circuit and perform short-range wireless communication. For example, the short-range wireless communication circuit may be a Wi-Fi communication circuit.

According to various embodiments, the sensor 376 may be identical to the sensor module 176 described with reference to FIG. 1. The sensor 376 may include at least one sensor to determine a user contact state with the electronic device 301. For example, the sensor 376 may include a gesture sensor, a gyro sensor, an acceleration sensor, a grip sensor, a proximity sensor, a color sensor, an IR sensor, or an illuminance sensor. The sensor 376 may generate a signal corresponding to the presence or absence of a user contact on the electronic device 301, and a contact state, and transmit the signal to the processor 320.

According to various embodiments, the temperature sensor 340 may include a plurality of temperature sensors. The plurality of temperature sensors may be used to measure a temperature during charging. The temperature sensor 340 may be a plurality of thermistors disposed inside the electronic device 301. The temperature sensor 340 may output a temperature value based on a resistance value that varies according to a temperature, or the processor 320 may identify the temperature value based on the resistance value. According to an embodiment, the temperature sensor 340 may be disposed at a position corresponding to or adjacent, directly or indirectly, to one (e.g., a component serving as a main heat source) of the components included in the electronic device 301. For example, the temperature sensor 340 may be disposed in an area adjacent, directly or indirectly, to at least one of components such as the processor 320, the PMIC 380, the battery 385, and the communication circuit 390. According to an embodiment, in addition to the above components, the electronic device 301 may further include various other components including a sub-printed circuit board (sub-PCB) (not shown) or a housing, and the temperature sensor 340 may be further disposed adjacent to each of various other components, such as an input module (e.g., USB) and an audio module. According to an embodiment, the temperature sensor 340 may operate under the control of the processor 320. The temperature sensor 340 may passively transmit information about a state corresponding to a temperature value in response to a command from the processor 320, and the processor 320 may obtain a temperature associated with at least one of the components of the electronic device 301 from the temperature sensor 340 in response to the reception. According to an embodiment, the temperature sensor 340 may provide a temperature value obtained at a position corresponding to at least one heat source (e.g., at least one component specified as a heat source) among the components included in the electronic device 301.

According to various embodiments, the processor 320 may obtain a heat temperature (or a surface heat temperature) of the electronic device 301 based on the temperature value obtained using the temperature sensor 340 during charging. For example, the processor 320 may obtain the heat temperature of the electronic device 301 by identifying a temperature value (or temperature values) that the temperature sensor 340 senses (or measures) periodically according to a specified period or in real time when charging is started.

According to various embodiments, the processor 320 may use a temperature sensor associated with the battery 385 among a plurality of temperature sensors 340, for the purpose of protecting the battery 385 and keeping the battery 385 charged during charging. For example, the processor 320 may identify a charging temperature range based on a temperature value from the temperature sensor associated with the battery 385.

According to an embodiment, when the temperature value from the temperature sensor associated with the battery 385 is outside a charging sustainable temperature range (e.g., when the temperature value is lower than 0 degrees or higher than 50 degrees), the processor 320 may control charging, using only the temperature sensor. For example, when the temperature value from the temperature sensor associated with the battery 385 is lower than 0 degrees or higher than 50 degrees, the processor 320 may block (or stop) the charging. Since the charging sustainable temperature range is for protecting the battery, the processor 320 may perform a charging control operation of stopping (or blocking) charging not to supply charging power to the battery 385, or blocking charging and then releasing the blocking, without controlling surface heat generation, when the measured temperature is outside the temperature range (e.g., 0 to 50 degrees).

Accordingly, a heat state may be determined using a plurality of temperature sensors during charging, and power control may be performed in consideration of a user contact state, as long as particularly a temperature value from the temperature sensor associated with the battery 385 among measured temperature values falls within an allowed temperature range during charging. In this manner, battery malfunction and swelling may be prevented or reduced.

As described above, a condition for determining a heat state using the plurality of temperature sensors may be based on the temperature value of the temperature sensor associated with the battery 385. To this end, the processor 320 may measure a temperature change at each position of the electronic device 301 in real time. The processor 320 may determine whether a heat generation situation occurs based on a temperature change at a corresponding position.

According to various embodiments, when a battery-related temperature value among measured temperature values is equal to or greater than a threshold value, the processor 320 may compare the battery-related temperature value with temperature values at other positions.

According to various embodiments, when the battery-related temperature value among the measured temperature values is equal to or greater than the threshold value, the processor 320 may predict a heat generation degree based on a relationship between the battery-related temperature value and the temperature values measured at the other positions. According to an embodiment, the processor 320 may obtain a heat temperature by using a stored algorithm (e.g., a linear regression analysis algorithm) for predicting a heat generation degree using a temperature value from the temperature sensor 340. According to an embodiment, when there are a plurality of temperature sensors 340, the processor 320 may obtain a heat temperature by using temperature values from the plurality of temperature sensors 340 disposed adjacent, directly or indirectly, to respective components of the electronic device 301, or obtain a heat temperature predicted through training in consideration of temperature values from the plurality of temperature sensors and a heat state of the electronic device 301.

According to various embodiments, the processor 320 may identify a heat generation 5 degree (or a surface heat state) based on differences between the measured temperature values and the battery-related temperature value.

According to an embodiment, when the difference between the battery-related temperature value and each of the other measured temperature values is equal to or greater than a specified temperature (e.g., 5 degrees), the processor 320 may determine a first heat state. The first heat state may be a local heat state. In other words, when at least one of the measured temperature values is different from the battery-related temperature value by the specified temperature or higher, the processor 320 may determine that the electronic device 301 is in the local heat state. For example, when the difference between the battery-related temperature value and a temperature value from the temperature sensor 376-6 adjacent to the second antenna module ANT2 (sub6) 294 of FIG. 2 is equal to or greater than the specified temperature (e.g., 5 degrees) or higher, the processor 320 may determine that heat is generated centering on a position at which the second antenna ANT2 (sub6) 294 is disposed.

According to an embodiment, when the difference between each of the measured temperature values and the battery-related temperature value is less than the specified temperature (e.g., 5 degrees), the processor 320 may determine a second heat state. The second heat state may be an overall heat state, which may correspond to a state in which a heating area (or a heat diffusion area) is larger than that of the first heat state. For example, when the battery-related temperature value is equal to or greater than a threshold (e.g., 36 degrees), and the difference from each of the measured temperature values is within the specified temperature, this may indicate that other components also generate heat similarly to the heat generation of the battery

385. Therefore, heat may be uniformly spread over the entire surface of the housing (e.g., the housing 210 of FIG. 2) of the electronic device 301.

According to an embodiment, when the difference between each of the measured temperature values and the battery-related temperature value is a negative number, the processor 320 may determine a third heat state. The third heat state may be an overall overheat state, which may correspond to a state in which heat is generated over a wider area than in the second heat state. According to another embodiment, when all of the differences between the measured temperature values and the battery-related temperature value are equal to or greater than the specified temperature (e.g., 5 degrees), the processor 320 may determine that the electronic device 301 is in the overall overheat state. For example, because the battery-related temperature value is equal to or greater than the threshold value (e.g., 36 degrees), and all of the measured temperature values are equal to or greater than the specified temperature, a severe overall heat state may be determined.

According to an embodiment, the processor 320 may determine a charging control amount according to a heat state. For example, the processor 320 may determine a charging control amount corresponding to each of the first heat state, the second heat state, and the third heat state. As the heating area is wider, the processor 320 may increase the charging control amount.

According to various embodiments, the processor 320 may use a user contact state, when determining the charging control amount. Since the user may feel a different heat level depending on the number of times the user makes contact with the electronic device 301, a touch area (e.g., a finger or palm), and a touch part (e.g., a hand or face), the processor 320 may adjust the charging control amount to lower the heat temperature according to the user contact state. Accordingly, the adjusted charging control amount may be different according to the user contact state. The user contact state refers to a state in which the user actually uses the electronic device 301 in contact with the electronic device 301. The user contact state is a selected one of a plurality of predetermined contact states, and the plurality of contact states may include at least one of a non-contact state, a partial front contact state, a front contact state, a rear contact state, a simultaneous partial front and rear contact state, or a simultaneous front and rear contact state.

For example, the non-contact state may be a state in which the user is using the electronic device 301 while placing it on the floor or on a cradle. When a sensor value from the sensor 376 (e.g., an acceleration sensor and a motion sensor) indicates that there is no movement, the processor 320 may identify the non-contact state from among the plurality of contact states.

The partial front contact state may refer to a state in which the user brings the electronic device 301 to the ear for a call. The processor 320 may determine that the user contact state corresponds to the partial front contact state among the plurality of contact states, based on a signal sensed through the sensor 376 (e.g., a proximity sensor disposed on the front surface of the electronic device 301).

The front contact state may be a state in which the user is in contact with most of the front surface of the electronic device 301 (e.g., by a palm touch). The processor 320 may identify the user contact state as the front contact state from among the plurality of contact states, based on a signal sensed from the sensor 376. For example, when one side of the user's face is in contact with most of the front surface of the electronic device 301 during a call, the charging control amount needs to be increased significantly, compared to the charging control amount in the partial front contact state, in order to reduce heat that the user feels relative to the state in which the user contacts the partial front surface, for a call. In addition, when the user uses an earphone or speakerphone during a call, the user is placed in the non-contact state, and thus it is necessary to guarantee a maximum or large charging amount. In this way, adjustment of a charging amount according to a user contact state may reduce user-felt heat and prevent or reduce an unnecessary increase in a charging time.

The rear contact state refers to a state in which the user grabs the electronic device 301, and a user contact area may correspond to most of the rear surface of the electronic device 301. The processor 320 may identify the user contact state as the rear contact state from among the plurality of contact states through the sensor 376 (e.g., a grip sensor).

The simultaneous partial front and rear contact state may correspond to a combination of the partial front contact state and the rear contact state.

The simultaneous front and rear contact state may correspond to a combination of the partial front contact state, the front contact state, and the rear contact state.

For example, when the non-contact state is level 0, the partial front contact state may be level 1, the front contact state may be level 2, the rear contact state may be level 3, the simultaneous partial front and rear contact state may be a combination of level 2 and level 3, level 4, and the simultaneous front and rear contact state may be a combination of level 1, level 2, and level 3, level 5. As described above, as the level increases, the area over which the user contacts the electronic device 301 increases. As the contact area is larger, the processor 320 may increase the charging control amount.

According to various embodiments, the processor 320 may determine the charging control amount in consideration of both the heat state and the user contact state. As a heat diffusion degree increases according to the heat state, the processor 320 may increase the charging control amount, and further adjust the charging control amount according to the user contact state. Further, when determining the charging control amount, the processor 320 may identify a current operation state and adjust the charging control amount by reflecting the identified operation state. A description related to adjustment of a charging control amount according to an operation scenario will be described in detail with reference to FIG. 5.

According to various embodiments, an electronic device (e.g., the electronic device 201 of FIG. 2 and the electronic device 301 of FIG. 3) may include the battery 385, the charging circuit/PMIC 380, the at least one sensor 376, the plurality of temperature sensors 340 disposed respectively at different positions, the at least one processor 320 operatively coupled, directly or indirectly, to the battery, the charging circuit, the at least one sensor, or the plurality of temperature sensors, and the memory 330. The memory 330 may store instructions which are configured to, when executed, cause the electronic device to, measure temperature values at intervals of a predefined period using the plurality of temperature sensors 340 during charging, identify a heat state based on at least in part of the measured temperature values, identify a user contact state using the at least one sensor 376, and control charging power for the battery 385 through the charging circuit/PMIC 380 based on the heat state and the user contact state.

According to various embodiments, the instructions may be configured to cause the electronic device to, in response to a battery-related temperature value among the measured temperature values being equal to or greater than a threshold value, identify the heat state based on a relationship between the battery-related temperature value and the other measured temperature values.

According to various embodiments, the instructions may be configured to cause the electronic device to identify a charging control amount based on the heat state and the user contact state, and supply charging power corresponding to the identified charging control amount to the battery through the charging circuit.

According to various embodiments, the instructions may be configured to cause the electronic device to identify an operation state of the electronic device, and adjust the identified charging control amount by reflecting the identified operation state.

According to various embodiments, the instructions may be configured to cause the electronic device to identify a control upper limit value corresponding to the identified operation state, compare the control upper limit value with a charging control value corresponding to the identified charging control amount, in response to the charging control value being less than the control upper limit value, adjust the identified charging control amount by adjusting the charging control value to the control upper limit value, and supply charging power corresponding to the adjusted charging control amount to the battery through the charging circuit.

According to various embodiments, the user contact state may be one selected from a plurality of predetermined contact states, and the plurality of contact states may include at least one of a non-contact state, a partial front contact state, a front contact state, a rear contact state, a simultaneous partial front and rear contact state, or a simultaneous front and rear contact state.

According to various embodiments, the instructions may be configured to cause the electronic device to increase the charging control amount, as a contact area according to the user contact state is larger.

According to various embodiments, the instructions may be configured to cause the electronic device to, in response to the user contact state being the non-contact state, identify the charging control amount based on the battery-related temperature value, and supply charging power corresponding to the identified charging control amount to the battery through the charging circuit.

According to various embodiments, the heat state may be a selected one of a plurality of predetermined heat states, and the plurality of heat states may include at least one of a local heat state, an overall heat state, or an overall overheat state.

According to various embodiments, the instructions may be configured to cause the electronic device to increase the charging control amount, as a heat diffusion degree according to the heat state is higher.

According to various embodiments, the instructions may be configured to cause the electronic device to identify whether a current charging period is a constant current charging period or a constant voltage charging period, and in response to the current charging period being the constant current charging period, adjust the identified charging control amount in correspondence with the constant current charging period.

Each embodiment herein may be used in combination with any other embodiment described herein.

Figure 4:
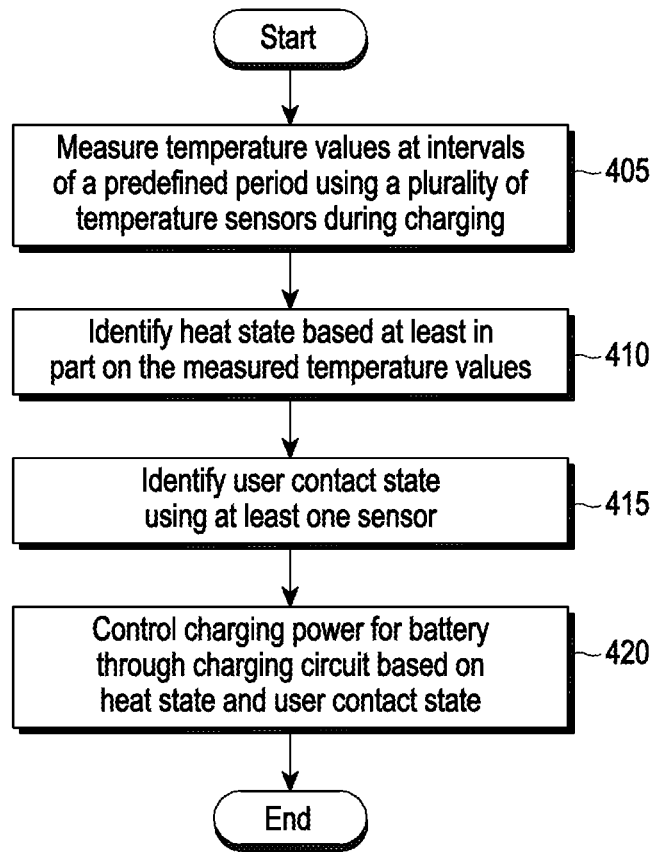
FIG. 4 is a flowchart illustrating an operation of performing heat control during charging in an electronic device according to various example embodiments.

FIG. 4 is a flowchart illustrating an operation of performing heat control during charging in an electronic device according to various embodiments.

Referring to FIG. 4, the operating method may include operations 405 to 420. Each step/operation of the operation method of FIG. 4 may be performed by an electronic device (e.g., the electronic device 101 of FIG. 1, the electronic device 201 of FIG. 2, and the electronic device 301 of FIG. 3) or at least one processor (e.g., at least one of the processor 120 of FIG. 1 or the processor 320 of FIG. 3) of the electronic device.

In operation 405, once charging starts, the electronic device 301 may measure temperature values using a plurality of temperature sensors at intervals of a predefined period during charging.

In operation 410, the electronic device 301 may identify a heat state based on at least in part of the measured temperature values.

According to various embodiments, in response to a battery-related temperature value among the measured temperature values being equal to or greater than a threshold value, the electronic device 301 may identify the heat state based on a relationship between the battery-related temperature value and the other measured temperature values. According to an embodiment, in response to the battery-related temperature value being equal to or greater than the threshold value (e.g., 36 degrees), the electronic device 301 may determine that heat control is required, and compare the battery-related temperature value with each of the temperature values measured at the other positions to identify the heat state. The heat state may be one selected from a plurality of predetermined heat states, and the plurality of heat states may include at least one of a local heat state, an overall heat state, or an overall overheat state.

The electronic device 301 may determine one of the plurality of heat states based on the difference between the battery-related temperature value and each of the other measured temperature values except for the battery-related temperature value.

For example, when the difference between the battery-related temperature value and each of the temperature values measured at the other positions is equal to or greater than a specified temperature (e.g., 5 degrees), the electronic device 301 may determine that the heat state is the local heat state. When the difference between the battery-related temperature value and each of the temperature values measured at the other positions is less than the specified temperature (e.g., 5 degrees), the electronic device 301 may determine that the heat state is the overall heat state in which heat is uniformly generated over the entire surface of the electronic device 301. Further, when the difference between the battery-related temperature value and each of the temperature values measured at the other positions is a negative number, the electronic device 301 may determine that the heat state is the overall overheat state in which the entire surface of the electronic device 301 is overheated. As such, the heat state may indicate a degree of heat spread over the surface of the electronic device 301.

In operation 415, the electronic device 301 may identify a user contact state using the at least one sensor 376. According to various embodiments, the user contact state is a selected one of a plurality of predetermined contact states, and the plurality of contact states may include at least one of a non-contact state, a partial front contact state, a front contact state, a rear contact state, a simultaneous partial front and rear contact state, or a simultaneous front and rear contact state.

For example, when the non-contact state is level 0, the partial front contact state may be level 1, the front contact state may be level 2, the rear contact state may be level 3, the simultaneous partial front and rear contact state may be a combination of level 2 and level 3, level 4, and the simultaneous front and rear contact state may be a combination of level 1, level 2, and level 3, level 5. As described above, as the level corresponding to a user contact state increases, which may indicate that the user contacts the electronic device 301 over a larger area, the electronic device 301 may increase a charging control amount.

In operation 420, the electronic device 301 may adjust charging power for the battery through the charging circuit based on the heat state and the user contact state.

According to various embodiments, identifying the heat state may include, in response to the battery-related temperature value among the measured temperature values being equal to or greater than a threshold value, identifying the heat state based on a relationship between the battery-related temperature value and the other measured temperature values.

According to various embodiments, controlling the charging power for the battery may include identifying a charging control amount based on the heat state and the user contact state, and supplying charging power corresponding to the identified charging control amount to the battery.

According to various embodiments, the method may further include identifying an operation state of the electronic device, and adjusting the identified charging control amount by reflecting the identified operation state.

According to various embodiments, adjusting the identified charging control amount may include identifying a control upper limit value corresponding to the identified operation state, comparing the control upper limit value with a charging control value corresponding to the identified charging control amount, and in response to the charging control value being less than the control upper limit value, adjusting the identified charging control amount by adjusting the charging control value to the control upper limit value.

For example, increasing the charging control amount may indicate strict charging control. In this case, the charging control value may be small. On the contrary, reducing the charging control amount may indicate loose charging control. In this case, the charging control value may be large. A detailed operation of FIG. 4 will be given later with reference to FIGS. 6A and 6B.

Figure 5:
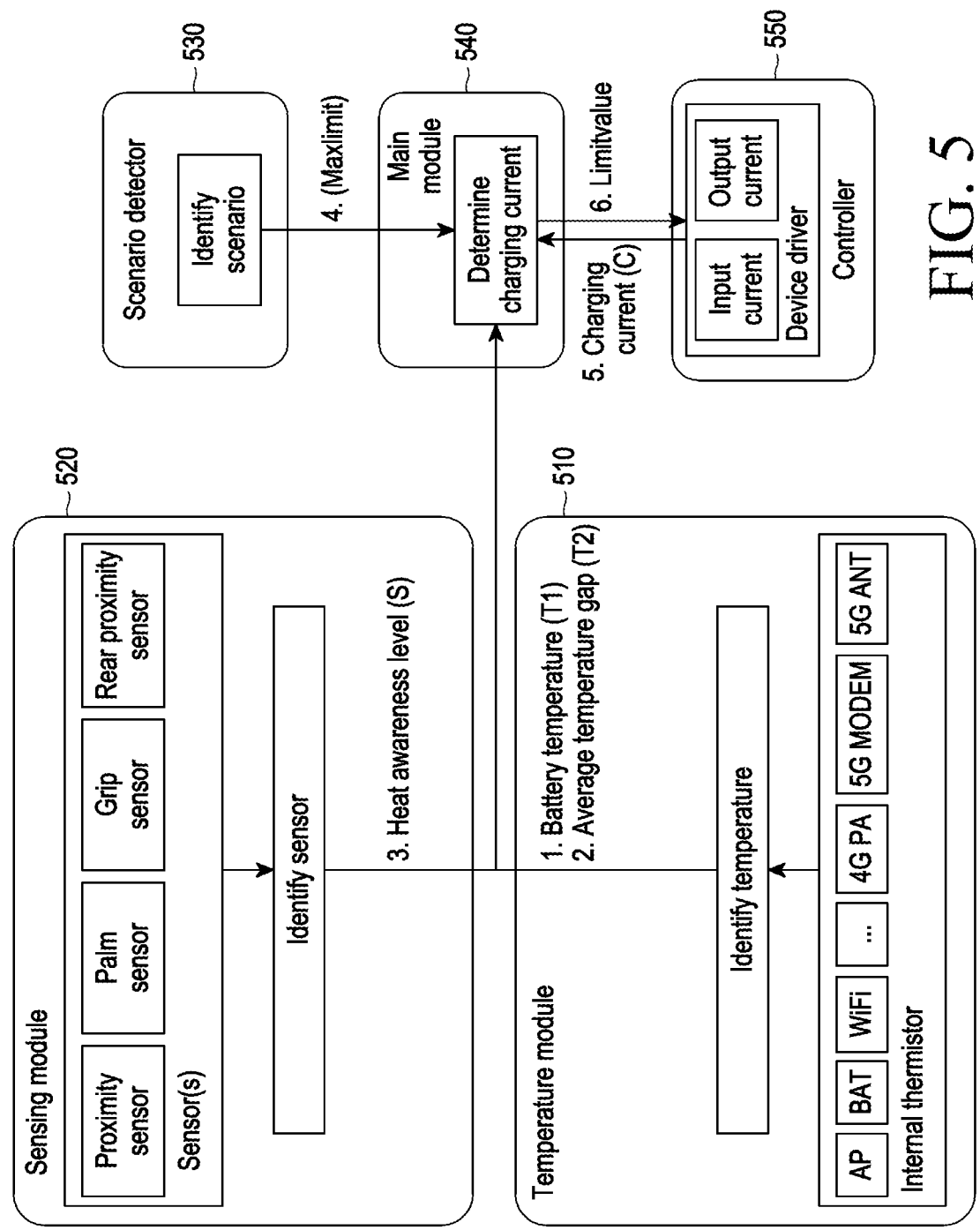
FIG. 5 is a block diagram illustrating heat control during charging according to various example embodiments.

FIG. 5 is a configuration diagram illustrating heat control during charging according to various embodiments.

Referring to FIG. 5, components for heat control during charging largely include at least one of a temperature module 510, a sensing module 520, a scenario detector 530, a main module 540, or a controller 550. Each "module" herein may comprise circuitry.

The temperature module 510 may include the plurality of temperature sensors illustrated in FIG. 3. The plurality of temperature sensors may be internal thermistors disposed adjacent to respective components corresponding to heat sources (e.g., AP, BAT, Wi-Fi, 4G modem, 5G modem, and 5G antenna), and the temperature module 510 may identify a temperature (or temperature value) associated with each of the components based on signals sensed by the plurality of temperature sensors. The temperature module 510 may identify whether heat is generated based on the temperature (or temperature value) associated with each of the components.

The temperature module 510 may identify how much heat is spread during charging and transmit an identification result to the main module 540, instead of directly transmitting a temperature sensing result to the main module 540.

For example, the temperature module 510 may periodically measure temperature values using the plurality of temperature sensors disposed at different positions, and compare a battery-related temperature value among the measured temperature values with a threshold value.

When the battery-related temperature value is equal to or greater than the threshold value, the temperature module 510 may calculate a temperature difference between each measured temperature value and the battery-related temperature value.

TABLE 1

| Level | Surface heat state | Temperature difference | Heat diffusion degree value (e.g.: T2) |
|---|---|---|---|
| Level 0 | Local heat state | Difference between temperature of each temperature sensor and battery temperature is 5 degrees or larger. (e.g.: local heat generation) | 0 |
| Level 1 | Overall heat state | Difference between temperature of each temperature sensor and battery temperature is within 5 degrees. (e.g.: uniformly diffused heat state) | −5% |
| Level 2 | Overall overheat state | Difference between temperature of each temperature sensor and battery temperature is negative number. (e.g.: severe overall surface heat state) | −10% |

The temperature module 510 may determine a heat state indicating how much heat is diffused, based on the temperature difference between each measured temperature value and the battery-related temperature value, referring to Table 1 above. For example, the heat state may be determined by obtaining an average difference (or gap) between each measured temperature value and the battery temperature.

The temperature module 510 may determine how much a charging control amount is to be increased based on a heat diffusion degree value (e.g., T2) corresponding to the heat state.

The temperature module 510 may determine a surface heat state, referring to Table 1. However, this is only exemplary, not limiting the disclosure. For example, since the difference between the temperature of each temperature sensor and the battery temperature is different depending on various conditions, the values (e.g., 5 degrees, negative number, 0, −5%, and −10%) in the table may be adjustable.

According to an embodiment, the temperature module 510 may determine a minimum or low control value (e.g., T1) according to the battery-related temperature value. For example, the temperature module 510 may calculate the minimum or low control value (e.g., T1) indicating a minimum or low charging control value to be applied to each battery-related temperature value, referring to Table 2 below.

TABLE 2

| Battery-related temperature value | Minimum control value (e.g.: T1) |
|---|---|
| e.g.: 36 degrees or higher | 90% |
| e.g.: 40 degrees or higher | 80% |
| e.g.: 44 degrees or higher | 70% |

According to Table 2, as the battery-related temperature value is greater, the temperature needs to be fast decreased by a larger value. For example, when the battery-related temperature value increases from 40 degrees to 44 degrees or higher, the charging control amount may be increased by decreasing the minimum or low control value (e.g., 80%→70% in this order). In this manner, the temperature may be lowered by increasing the charging control amount and thus perform strict charging control.

The sensing module 520 may identify a state in which the user makes contact with the electronic device 301. The sensing module 520 may identify a user contact state using sensors (e.g., a proximity sensor, a palm sensor, a grip sensor, or a rear proximity sensor).

The sensing module 520 may define how easily the user may feel heat in a situation in which the user is placed, in terms of a level and transmit the level to the main module 540.

TABLE 3

| Level | User contact state | Description of contact state | Control value for each contact state (e.g.: S) |
|---|---|---|---|
| Level 0 | Non-contact state | No motion signal from acceleration sensor, motion sensor, and so on (e.g.: placed on the floor or cradle) | −1 |
| Level 1 | Partial front contact state | Partial contact signal detected from front proximity sensor (e.g.: user brings electronic device to ear, for call) | 0.7 |
| Level 2 | Front contact state | Signal detected by touch sensor and front proximity sensor (e.g.: one side surface of user's face in contact with most of front surface during call) | 0.6 |
| Level 3 | Rear contact state | Contact signal detected by grip sensor (e.g.: user grabs electronic device) | 0.5 |
| Level 4 | Simultaneous partial front and rear contact state | Combination of partial front contact state and rear contact state | 0.3 |
| Level 5 | Simultaneous front and rear contact state | Combination of partial front contact state, front contact state, and rear contact state | 0.2 |

The sensing module 520 may identify the user contact state, referring to Table 3 above. The sensing module 520 may use sensors to identify a corresponding contact state among a plurality of predetermined contact states as illustrated in Table 3. For example, the sensing module 520 may identify how closely the user is in contact with the electronic device 301 using the sensors. The sensing module 520 may determine a per-contact state control value (e.g., S) indicating how much the charging control amount should be adjusted according to the user contact state, referring to Table 3 above, and transmit the per-contact state control value (e.g., S) to the main module 540.

The scenario detector 530 may identify an operation scenario of the electronic device 301. For example, the scenario detector 530 may identify a current operation state and then calculate a control upper limit (e.g., Maxlimit) in a corresponding application, referring to Table 4 below. The control upper limit (e.g., Maxlimit) may be a minimum or low charging value that should be guaranteed in the corresponding operation scenario.

TABLE 4

| Operation scenario | Control upper limit (e.g.: Maxlimit) |
|---|---|
| Game | 20% |
| Smart view | 15% |
| Camera shooting | 15% |
| Video play | 10% |
| navigation | 10% |
| default | 0% |

Referring to Table 4 above, for example, when a current running application is a game application, it is indicated that given a maximum charging amount of 100%, up to 20% of the maximum charging amount may be controlled. In this case, the control upper limit of 20% is a control upper limit value for the game application, indicating that control of more than 20% is not allowed during a game.

The main module 540 may determine a final charging current based on output results of the temperature module 510, the sensing module 520, and the scenario detector 530, and transmit the final charging current to the controller 550. For example, the controller 550 may notify the main module 540 of an initial charging current C, upon start of charging, and a current charging current C during the charging. According to an embodiment, the controller 550 may identify whether a current charging period is a constant current (CC) charging period or a constant voltage (CV) charging period. In the case of the CC charging period, the controller 550 may calculate a charging current C corresponding to the CC charging period, referring to Table 5 below, and notify the main module 540 of the charging current C.

TABLE 5

| Level | Charging period | Charging current (e.g.: C) |
|---|---|---|
| Level 0 | Constant voltage (CV) charging period | 0 |
| Level 1 | Constant current (CC) charging period | −10% |

According to an embodiment, the main module 540 may receive the minimum or low control value (e.g., T1) and the heat diffusion degree value (e.g., T2) according to the battery temperature from the temperature module 510. The main module 540 may also receive the per-contact state control value (e.g., S) from the sensing module 520. Additionally, the main module 540 may receive the per-operation scenario control upper limit value (e.g., Maxlimit) from the scenario detector 530.

According to an embodiment, the main module 540 may determine a final charging control value based on at least one of the minimum or low control value (e.g., T1), the heat diffusion degree value (e.g., T2), the per-contact state control value (e.g., S), or the charging current C. The main module 540 may determine a charging control value indicating how much to limit charging based on the charging current C, and transmit the determined charging control value (e.g., Limitvalue) to the controller 550.

In various example embodiments, "controlling (or adjusting) a charging control amount" may indicate increasing and/or decreasing a charging control value. For example, decreasing a charging control value may indicate making the charging control amount large (or high), that is, strict charging control. In addition, increasing a charging control value may indicate making the charging control amount small (or little), that is, loose charging control.

The controller 550 may supply a charging current (or charging power) corresponding to the charging control value (e.g., Limitvalue) to the battery, referring to Table 6 below.

TABLE 6

| Charging control value (e.g.: Limitvalue) | Charging current (or charging amount) input to battery |
|---|---|
| 100% or negative number | 5 A |
| 80% | 4 A |
| 60% | 3 A |
| 40% | 2 A |
| 20% | 1 A |
| 0% | 0 A |

The values in Table 1 to Table 6 are merely exemplary and thus adjustable, not limiting the disclosure.

As described above, the main module 540 may determine a control value for heat control by periodically monitoring a change in at least one of the minimum control value (e.g., T1), the heat diffusion degree value (e.g., T2), the per-contact state control value (e.g., S), or the charging current C.

While an operation of heat control during charging has been described above as performed by each module such as the temperature module 510, the sensing module 520, the scenario detector 530, the main module 540, or the controller 550, by way of example, some of these components may be implemented as a single IC. For example, the operation may be performed by the processor 320. Each "processor" herein comprises processing circuitry.

Figure 6A:
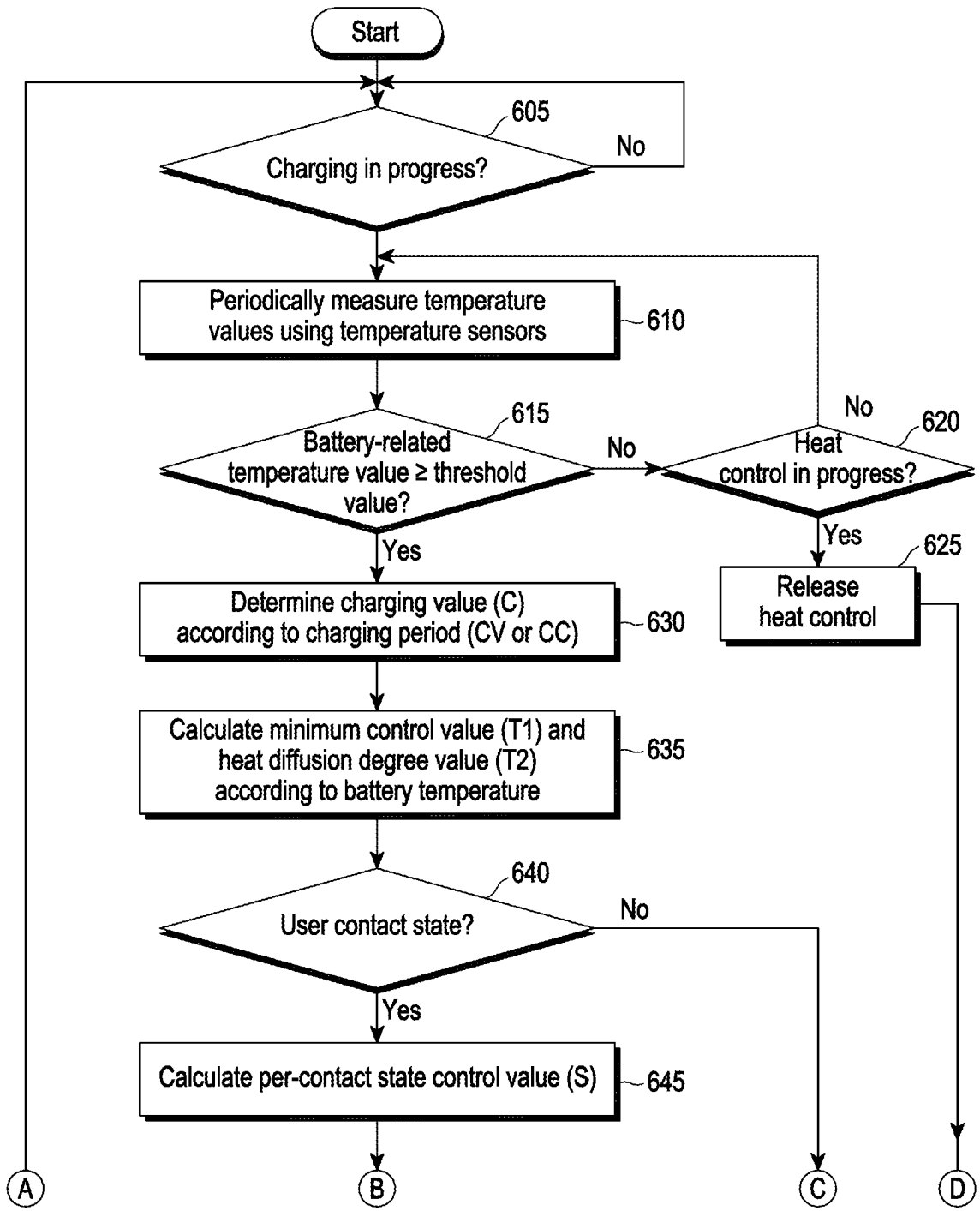
FIG. 6A is a detailed flowchart illustrating an operation of performing heat control during charging in an electronic device according to various example embodiments.
Figure 6B:
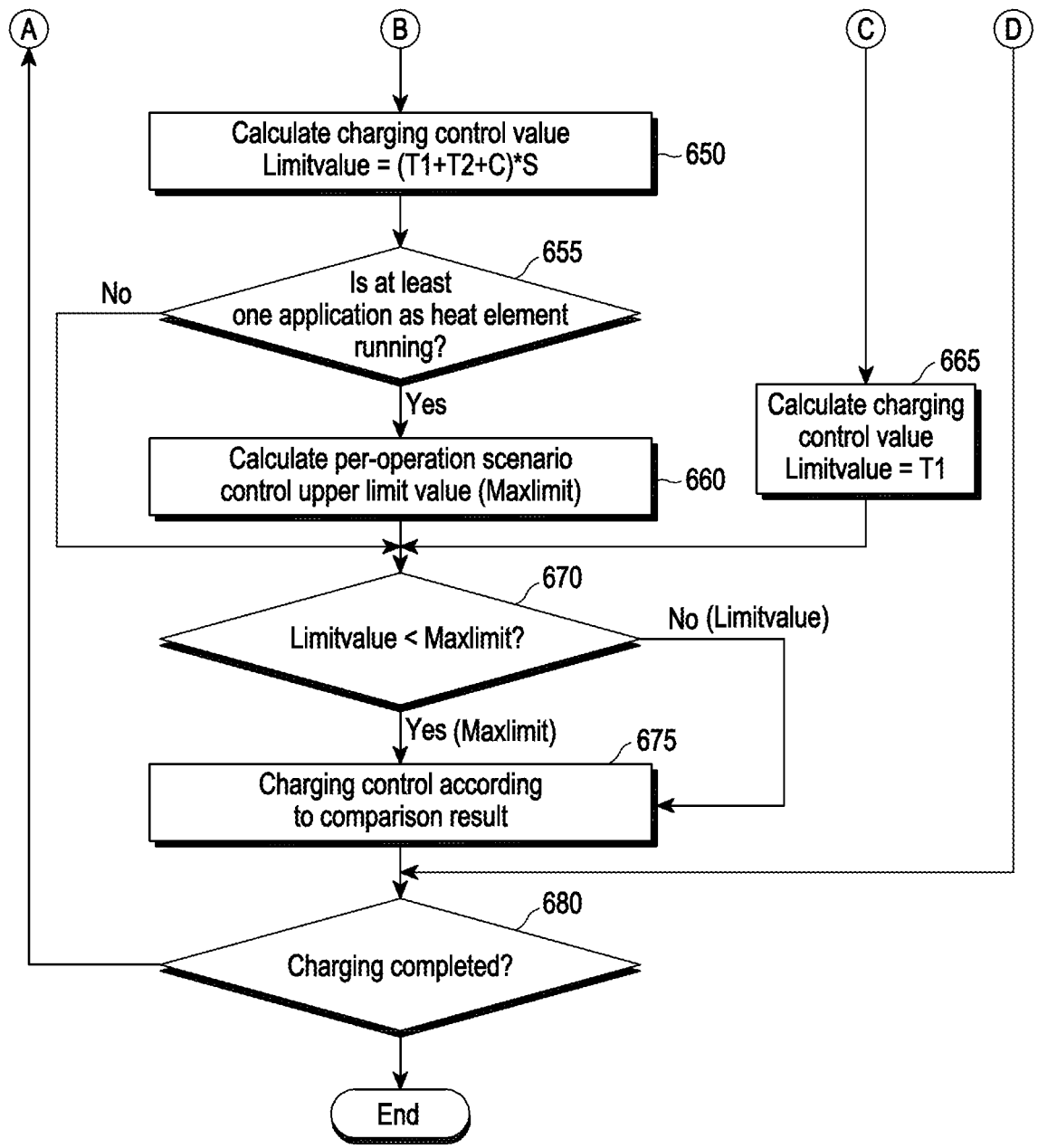
FIG. 6B is a flowchart subsequent to the flowchart of FIG. 6A.

FIG. 6A is a detailed flowchart illustrating an operation of performing heat control during charging in an electronic device according to various embodiments, and FIG. 6B is a flowchart subsequent to the flowchart of FIG. 6A. In FIGS. 6A and 6B, identification symbols A, B, C, and D may be used to indicate connection between the operations of the flowcharts.

In operation 605, the electronic device 301 may identify whether charging is in progress. In operation 610, the electronic device 301 may periodically measure temperature values using temperature sensors.

In operation 615, the electronic device 301 may identify whether a battery-related temperature value is equal to or greater than a threshold value. When the battery-related temperature value is less than the threshold value, the electronic device 301 may identify whether heat control is in progress in operation 620. When heat control is already in progress, the electronic device 301 may release the heat control in operation 625, and proceed to operation 680 of FIG. 6B.

According to an embodiment, based on the battery-related temperature value being equal to or greater than the threshold value, the electronic device 301 may determine a charging value C according to a charging period (e.g., a CV or CC period) in operation 630.

In operation 635, the electronic device 301 may calculate a minimum or low control value (e.g., T1) and a heat diffusion degree value (e.g., T2) according to a battery temperature. The heat diffusion degree value may refer to a surface heat state.

In operation 640, the electronic device 301 may identify whether it is in a user contact state. According to an embodiment, the electronic device 301 may identify whether a user has touched, a contact surface, or the size of a contact area, using the at least one sensor 376, and determine one of a plurality of user contact states. Based on identification of the user contact state, the electronic device 301 may calculate a per-contact state control value (e.g., S) in operation 645. For example, the electronic device 301 may determine whether the user contact state corresponds to the non-contact state, the partial front contact state, the front contact state, the rear contact state, the simultaneous partial front and rear contact state, or the simultaneous front and rear contact state, based on a signal sensed by the at least one sensor 376. "Based on" as used herein covers based at least on.

In operation 650, the electronic device 301 may calculate a charging control value.

According to an embodiment, the charging control value for the user contact state may be calculated by Equation 1 below.

$$\text{Limitvalue}=(T1+T2+C)*S \qquad \text{[Equation 1]}$$

In Equation 1, "Limitvalue" may represent a charging control value, "T1" may represent a minimum or low control value according to a battery temperature, "T2" may represent a heat diffusion degree value indicating a surface heat state, "C" may represent a charging degree value indicating a charging amount, and "S" may represent a per-user contact state control value.

In operation 655, the electronic device 301 may identify whether at least one application is running as a heat element. Based on at least one application being executed, the electronic device 301 may calculate a per-operation scenario control upper limit value (e.g., Maxlimit) in operation 660.

According to various embodiments, the charging control amount may be adjusted adaptively according to whether the user uses the electronic device 301 in contact with the electronic deice 301 as well as heat generation from components during charging. Therefore, the electronic device 301 may be continuously used, and a user-felt surface temperature may be reduced as well.

According to an embodiment, although operation 630 of determining the charging value C, operation 635 of calculating the minimum control value T1 and the heat diffusion degree value T2, operation 645 of calculating the per-user contact state control value S, and operation 660 of calculating the per-operation scenario control upper limit value (e.g., Maxlimit) may be sequentially performed as illustrated in FIGS. 6A and 6B, they may also be performed in parallel.

According to an embodiment, when the electronic device 301 is not in the user contact state in operation 640, the electronic device 301 may calculate a charging control value (e.g., Limitvalue) based on the minimum or low control value (e.g., T1) according to the battery temperature in operation 665. For example, in the non-contact state in which the user is using the electronic device 301 by placing it on the floor or on a cradle, the electronic device 301 may not be in the user contact state. In the non-contact state, the electronic device 301 may set the charging control value (e.g., Limitvalue) to the minimum or low control value (e.g., T1) according to the battery temperature because it does not need to consider user-felt heat. As such, the electronic device 301 may loosen the heat control in a non-use state, whereas when the user uses the electronic device 301 in contact with the electronic device, the user feels a different degree of heat according to a contact state (e.g., a contact area), and thus the electronic device may control a charging amount according to the contact state, for heat control.

In operation 670, the electronic device 301 may compare the charging control value (e.g., Limitvalue) with the control upper limit value (e.g., Maxlimit) to identify whether the charging control value is less than the control upper limit value. When the charging control value is less than the control upper limit value, the electronic device 301 may set the charging control value to the control upper limit value. On the contrary, when the charging control value is not less than the control upper limit value, the electronic device 301 may maintain the charging control value. According to an embodiment, when the charging control value (e.g., Limitvalue) is less than the control upper limit value (e.g., Maxlimit), the electronic device 301 may adjust the charging control value to the control upper limit value to ensure minimum performance during charging.

In operation 675, the electronic device 301 may perform charging control according to a comparison result. According to an embodiment, when the charging control value is less than the control upper limit value, the electronic device 301 may adjust the charging control amount by setting the charging control value to the control upper limit value. Accordingly, the electronic device 301 may supply charging power corresponding to the adjusted charging control amount to the battery. For example, in the case where an operation state (e.g., application execution state) of the electronic device 301 is considered, when a charging control value reflecting a surface heat state and a user contact state is less than a control upper limit value corresponding to a minimum or low control value required in a current operation state, the charging control value may be increased to ensure current operation performance as much as possible and enable charging. In this manner, the electronic device 301 may determine the charging control value adjusted to the control upper limit value as a final charging control value, thereby identifying a charging current according to the final charging control value and controlling to apply the charging current to the battery through the charging circuit.

In operation 680, the electronic device 301 may identify whether the charging has been completed. According to an embodiment, when the charging is completed (e.g., a fully charged state) during the charging of the battery with power supplied from an external device, the electronic device 301 may not receive any more power from the external device. Therefore, when there is no power received from the external device, it may be considered that the charging has been completed.

According to an embodiment, unless the charging is completed, the electronic device 301 may return to operation 605 to repeatedly perform the above-described operations. For example, the measured temperatures are gradually lowered by performing the charging control 5 operation of lowering a heat temperature. When the battery-related temperature value is lowered below the threshold in operation 615, the electronic device 301 may release the heat control operation (or heat control mode). In this manner, the electronic device 301 may repeat the foregoing operations, while periodically monitoring a heat generation situation.

Figure 7:
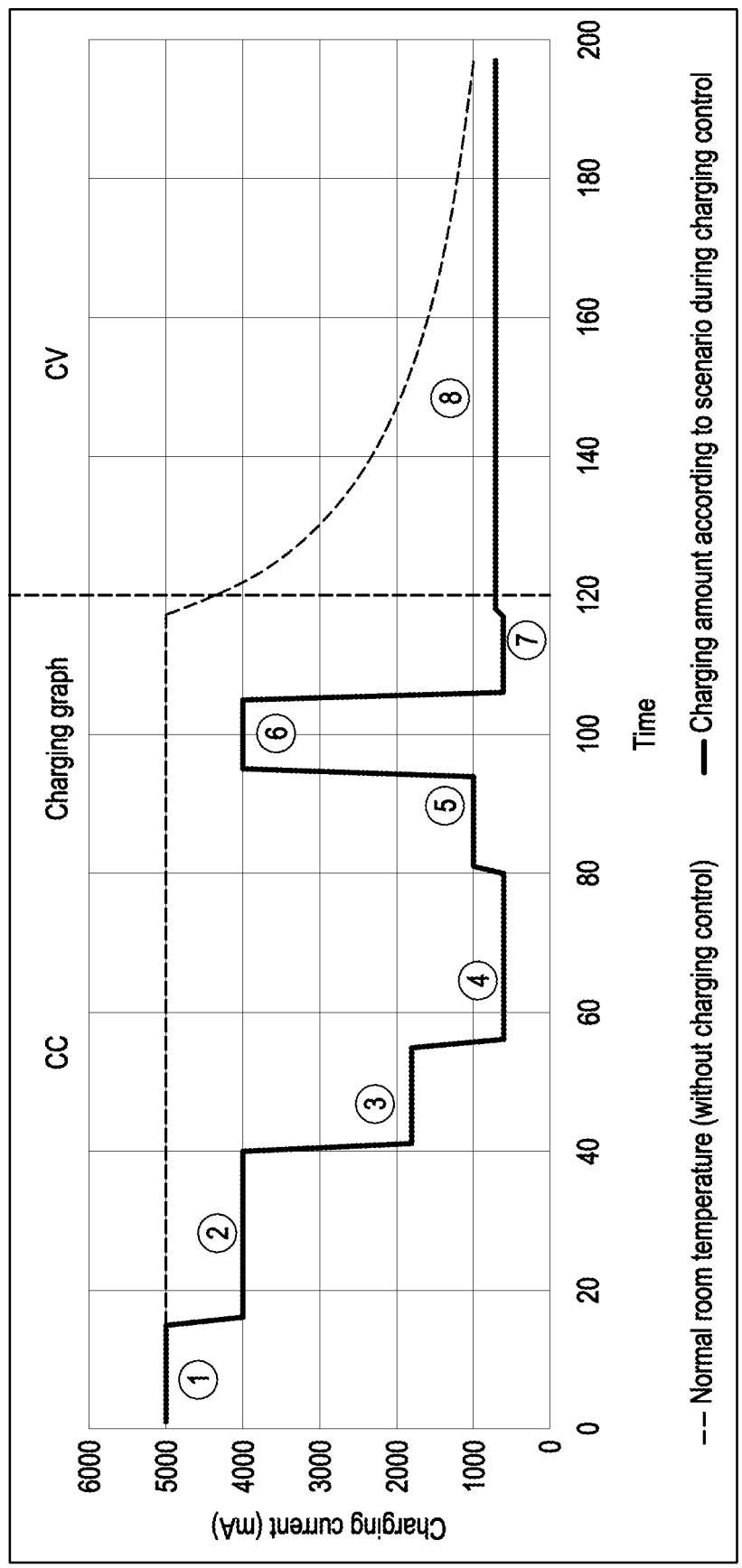
FIG. 7 is a graph illustrating changes in a charging current in a constant current period and a constant voltage period during battery charging according to various example embodiments.

FIG. 7 is a graph illustrating changes in a charging current according to a CC period and a CV period during battery charging according to various embodiments. In FIG. 7, the horizontal axis represents time, and the vertical axis represents the magnitude of the charging current.

Referring to FIG. 7, the electronic device 301 may charge its battery with specified first power (charging power of a first magnitude or a first CC for a specified time). The electronic device 301 may operate in a normal charging mode for charging with a low CC, or in a fast charging mode for charging with a high CC. The electronic device 301 may receive required charging power from a charger coupled through a wired or wireless connection.

It may be noted from FIG. 7 that in the case of battery charging without a charging control operation (e.g., see a dotted line curve), as the battery is gradually charged over the CC period and then enters the CV period, the charging current continuously decreases until the battery is fully charged (100%). When the voltage of the battery then reaches a fully charged voltage, the charging current may decrease and the battery may be fully charged. The battery charge level 100% may be satisfied based on various criteria, for example, when a battery voltage is equal to or greater than a specified voltage (or the fully charged voltage) or when the applied current is less than or equal to a predetermined current.

According to various embodiments, because the charging power decreases in the CV period, the charging amount is small. Therefore, the charging control amount is not adjusted. In contrast, the risk of heat generation may be higher due to a large charging amount in the CC period. Accordingly, an increase in a charging control degree in the CC period may enable efficient charging control simultaneously with heat control.

Further, the electronic device 301 may provide fast battery charging during wired or wireless charging by applying a fast charging technology. To provide the fast charging technology, the charging current should be increased. Accordingly, when using the electronic device 301 while holding it, the user may be vulnerable to the risk of low-temperature burns due to skin contact. Therefore, in addition to consideration of the surface heat state and the user contact state, the charging control degree may be increased during the CC period, compared to the CV period, thereby minimizing or reducing the level of user-felt heat in an initial charging stage.

According to an embodiment, it may be assumed that the electronic device 301 having a normal room temperature (e.g., 25° C.) as a battery-related temperature is placed during a period ①. According to Equation 1, a charging control value (e.g., Limitvalue) may be obtained by summing a minimum or low control value (e.g., T1) according to a battery temperature, a heat diffusion degree value (e.g., T2) indicating a heat state, and a charging degree value (e.g., C) indicating a charging amount, and then multiplying the sum by a per-user contact state control value (e.g., S). Accordingly, when the charging control value is 100%, the electronic device 301 may supply a charging current (e.g., 5A) corresponding to the charging control value to the battery.

According to an embodiment, it may be assumed that the electronic device 301 having a first temperature (e.g., 40° C.) as a battery-related temperature is placed during a period ②. According to Table 2, the battery-related temperature corresponds to, for example, 40° C. or higher, the minimum or low control value (e.g., T1) is 80%, T2=0, and S=−1 due to the non-contact state. Therefore, when the charging control value (e.g., Limitvalue) is 80%, the electronic device 301 may supply a charging current (e.g., 4A) corresponding to the charging control value to the battery.

According to an embodiment, it may be assumed that the user is using a first application (e.g., social networking service (SNS)) in the front contact state of the electronic device 301 having the first temperature (e.g., 40° C.) as a battery-related temperature during a period ③. According to Equation 1, T1 is 80%, T2 is −10%, C is −10%, and S is 0.6, a control value corresponding to the front contact state. Therefore, the charging control value is 36% by calculating (80%+(−10%)+(−10%))*0.6, and the electronic device 301 may apply a charging current (e.g., 1.8A) corresponding to the charging control value (e.g., 36%) to the battery.

According to an embodiment, it is assumed that the user is using the first application (e.g., SNS) in the front/rear contact state of the electronic device 301 having the first temperature (e.g., 40° C.) as a battery-related temperature during a period ④. The charging control value becomes 12% by calculating (80%+(−10%)+(−10%))*0.2, and the electronic device 301 may apply a charging current (e.g., 0.6A) corresponding to the charging control value (e.g., 12%) to the battery.

According to an embodiment, it may be assumed that the user is using a second application (e.g., game) in the front/rear contact state of the electronic device 301 having the first temperature (e.g., 40° C.) as a battery-related temperature during a period 5. The charging control value may be 12% by calculating (80%+(−10%)+(−10%))*0.2. Because the charging control value (e.g., Limitvalue) is less than a control upper limit value (e.g., Maxlimit) of 20% in the second application, the charging control value may be set to the control upper limit value. Accordingly, the electronic device 301 may apply a charging current (e.g., 1A) corresponding to the charging control value (e.g., 20%) to the battery.

According to an embodiment, it may be assumed that the electronic device 301 having the first temperature (e.g., 40° C.) as a battery-related temperature is placed during a period ⑥. In this case, the electronic device 301 may apply a charging current (e.g., 4A) corresponding to a charging control value (e.g., 80%) to the battery.

According to an embodiment, it is assumed that the user is using the first application (e.g., SNS) in the front/rear contact state of the electronic device 301 having the first temperature (e.g., 40° C.) as a battery-related temperature during a period ⑦. Since this case is similar to the situation in the period ④, the electronic device 301 may apply a charging current (e.g., 0.6A) corresponding to a charging control value (e.g., 12%) to the battery.

According to one embodiment, although the electronic device 301 is under the same condition as in the period ⑦, as the battery is gradually charged, the electronic device 301 enters the CV period during a period ⑧. Therefore, the charging control value is 14% by calculating (80%+(−10%)) *0.2. Accordingly, the electronic device 301 may apply a charging current (e.g., 0.7A) corresponding to the charging control value (e.g., 14%) to the battery.

According to FIG. 7, low-temperature burns caused by skin contact may be prevented or reduced by decreasing the charging current in the periods (e.g., ③, ④, and ⑤) corresponding to the user contact state below the charging current in the periods (e.g. ①, ②, and ⑥) corresponding to the non-contact state. According to an embodiment, controlling the charging current value in the CC period may be advantageous to lower the surface temperature of the electronic device 301.

Figure 8:
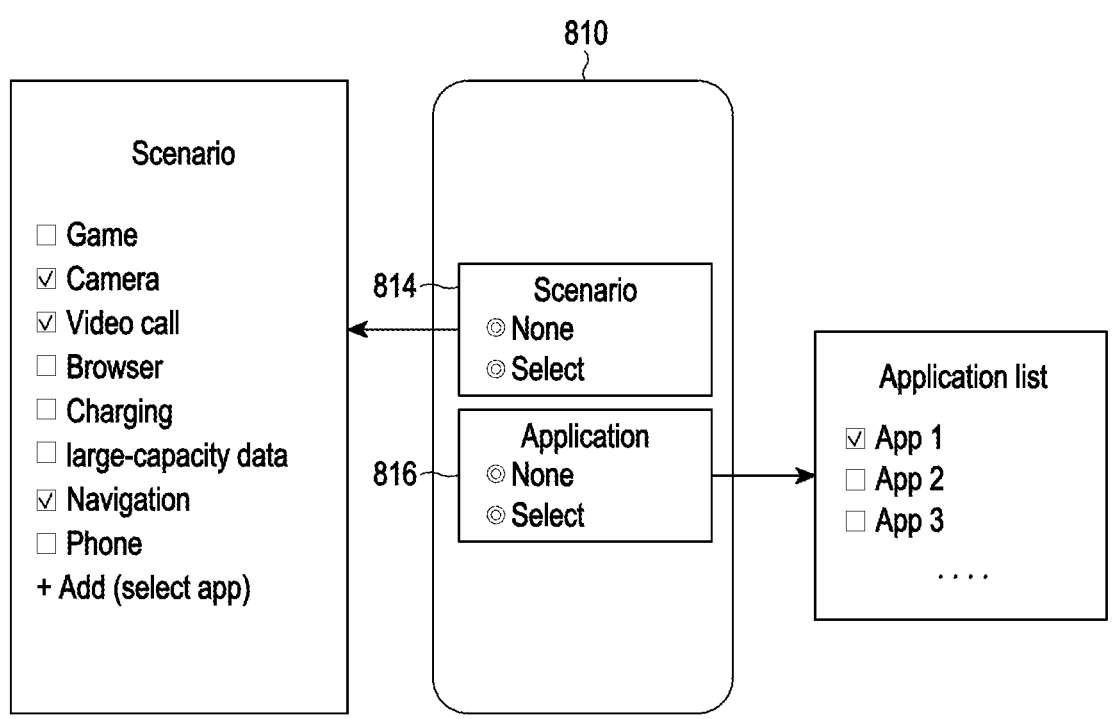
FIG. 8 is a diagram illustrating an exemplary application scenario related to an operation of an electronic device during charging according to various example embodiments.

FIG. 8 is a diagram illustrating an application scenario related to an operation of an electronic device during charging according to various embodiments.

Referring to FIG. 8, the electronic device 301 may set a different control upper limit for each scenario (e.g., game, smart view, camera, video play, navigation, or default (e.g., no application in use or others). If a charging control amount is adjusted based only on a user contact state to lower a heat temperature, a charging time may be lengthened. In this case, the usage of the electronic device 301, for example, an application running on the electronic device 301 may be identified, and a control upper limit value which is a minimum or low charging control value to be ensured for the application may be used for charging control. For example, when the user is using a game application while grabbing the electronic device 301, a user-felt heat temperature may be reduced by lowering charging power to a charging control amount corresponding to a user contact state. However, to guarantee the performance of the game application, the charging control upper limit needs to be high despite a high user-felt heat temperature. In this case, the electronic device 301 may compare the control value of the charging control amount corresponding to the user contact state with the control upper limit value of the game application. When the control value is smaller than the control upper limit value, the electronic device 301 may adjust the control value to the control upper limit value, thereby adjusting the charging control amount. On the contrary, when the control value is greater than the control upper limit value, the control value may be a final charging control value. Although an operation scenario reflected in determining a charging control amount may be predetermined in the process of manufacturing the electronic device 301, the operation scenario may also be determined according to a user selection, as illustrated in FIG. 8. For example, the user may select, through a user interface (UI) 810 of the electronic device 301, whether to apply an operation scenario (814) and whether to select an application having a control upper limit (816).

As described above, when determining a charging control amount according to a user contact state, the electronic device 301 may reflect the operation scenario of the electronic device 301 to supply charging power corresponding to a final charging control value to the battery 385. Therefore, a user-felt heat level may be reduced, while the operation performance of the electronic device 301 is ensured.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B", "at least one of A and B", "at least one of A or B", "A, B, or C", "at least one of A, B, and C", and "at least one of A, B, or C", may include any one of, or all possible combinations of the items enumerated together in a corresponding one of the phrases. As used herein, such terms as "1st" and "2nd", or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with", "coupled to", or "connected to" another element (e.g., a second element), it means that the element may be coupled with the other element directly (e.g., wiredly), wirelessly, or via at least a third element.

As used in connection with various example embodiments, the term "module" may include a unit implemented in hardware, software, or firmware, and may interchangeably be used with other terms, for example, logic, logic block, part, or circuitry. A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., the internal memory 136 or the external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one 5 function according to the at least one instruction invoked. The one or more instructions may include a code generated by a compiler or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various example embodiments may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

A storage medium may store instructions configured to, when executed by at least one processor of an electronic device, cause the electronic device to perform at least one operation. The at least one operation may include, measuring temperature values at intervals of a predefined period using a plurality of temperature sensors during charging, identifying a heat state based on at least in part of the measured temperature values, identifying a user contact state using at least one sensor, and controlling charging power for a battery based on the heat state and the user contact state.

What is claimed is:

1. An electronic device comprising:
   a battery;
   a charging circuit;
   at least one sensor;
   a plurality of temperature sensors respectively disposed at different positions;
   at least one processor, comprising processor circuitry, operatively coupled to at least one of the battery, the charging circuit, the at least one sensor, or the plurality of temperature sensors; and
   memory storing instructions that, when executed by the at least one processor, individually and/or collectively, cause the electronic device to:
   measure temperature values at intervals of a predefined period via the plurality of temperature sensors during charging,
   identify a heat state based at least in part on the measured temperature values,
   detect a change in a user contact area of the electronic device using the at least one sensor, the change in user contact area being a change among a plurality of contact states in which the user is in actual physical contact with the electronic device; and
   control charging power for the battery through the charging circuit based on the heat state and the change in user contact area with the electronic device.

2. The electronic device of claim 1, wherein the instructions are configured to cause the electronic device to, based on a battery-related temperature value among the measured temperature values being equal to or greater than a threshold value, identify the heat state based at least on a relationship between the battery-related temperature value and other measured temperature values.

3. The electronic device of claim 1, wherein the instructions are configured to cause the electronic device to:
   identify a charging control amount based at least on the heat state and the change in user contact area, and
   supply charging power corresponding to the identified charging control amount to the battery through at least the charging circuit.

4. The electronic device of claim 3, wherein the instructions are configured to cause the electronic device to:
identify an operation state of the electronic device, and
adjust the identified charging control amount corresponding to the identified operation state.

5. The electronic device of claim 4, wherein the instructions are configured to cause the electronic device to:
identify a control upper limit value corresponding to the identified operation state,
compare the control upper limit value with a charging control value corresponding to the identified charging control amount,
in response to the charging control value being less than the control upper limit value, adjust the identified charging control amount at least by adjusting the charging control value to the control upper limit value, and
supply charging power corresponding to the adjusted charging control amount to the battery through at least the charging circuit.

6. The electronic device of claim 3, wherein the change in user contact areas is a change among a plurality of predetermined contact states including at least one of a partial front contact state, a front contact state, a rear contact state, a simultaneous partial front and rear contact state, or a simultaneous front and rear contact state.

7. The electronic device of claim 6, wherein the instructions are configured to cause the electronic device to increase the charging control amount, as the user contact area is larger.

8. The electronic device of claim 6, wherein the instructions are configured to cause the electronic device to:
in response to the change in user contact area being the non-contact state, identify the charging control amount based on the battery-related temperature value, and
supply charging power corresponding to the identified charging control amount to the battery through the charging circuit.

9. The electronic device of claim 3, wherein the heat state is a selected one of a plurality of predetermined heat states, and the plurality of heat states include at least one of a local heat state, an overall heat state, or an overall overheat state.

10. The electronic device of claim 9, wherein the instructions are configured to cause the electronic device to increase the charging control amount, as a heat diffusion degree according to the heat state is higher.

11. The electronic device of claim 1, wherein the instructions are configured to cause the electronic device to:
identify whether a current charging period is a constant current charging period or a constant voltage charging period, and
in response to the current charging period being the constant current charging period, adjust the identified charging control amount based on the constant current charging period.

12. A method of operating an electronic device, comprising:
measuring temperature values at intervals of a predefined period using a plurality of temperature sensors during charging;
identifying a heat state based at least in part on the measured temperature values;
detecting a change in a user contact area of the electronic device using at least one sensor of the electronic device, the change in user contact area being a change among a plurality of contact states in which the user is in actual physical contact with the electronic device; and
controlling charging power for a battery of the electronic device based on the heat state and the change in user contact area with the electronic device.

13. The method of claim 12, wherein identifying the heat state comprises, in response to a battery-related temperature value among the measured temperature values being equal to or greater than a threshold value, identifying the heat state based on a relationship between the battery-related temperature value and other measured temperature values.

14. The method of claim 12, wherein controlling the charging power for the battery comprises:
identifying a charging control amount based on the heat state and the change in user contact area; and
supplying charging power corresponding to the identified charging control amount to the battery.

15. The method of claim 14, further comprising:
identifying an operation state of the electronic device; and
adjusting the identified charging control amount based on the identified operation state.

16. The method of claim 15, wherein adjusting the identified charging control amount comprises:
identifying a control upper limit value corresponding to the identified operation state;
comparing the control upper limit value with a charging control value corresponding to the identified charging control amount; and
in response to the charging control value being less than the control upper limit value, adjusting the identified charging control amount at least by adjusting the charging control value to the control upper limit value.

17. The method of claim 14, wherein the change in user contact areas is a change among a plurality of predetermined contact states including at least one of a partial front contact state, a front contact state, a rear contact state, a simultaneous partial front and rear contact state, or a simultaneous front and rear contact state.

18. The method of claim 17, wherein identifying the charging control amount comprises increasing the charging control amount, as the user contact area becomes larger.

19. The method of claim 14, wherein the heat state is a selected one of a plurality of predetermined heat states, and the plurality of heat states include at least one of a local heat state, an overall heat state, or an overall overheat state.

20. A non-transitory storage medium storing instructions configured to, when executed by at least one processor, comprising processor circuitry, of an electronic device, cause the electronic device to perform at least one operation, wherein the at least one operation includes:
measuring temperature values at intervals of a predefined period using a plurality of temperature sensors of the electronic device during charging;
identifying a heat state based at least in part on the measured temperature values;
detecting a change in a user contact area of the electronic device using at least one sensor of the electronic device, the change in user contact area being a change among a plurality of contact states in which the user is in actual physical contact with the electronic device; and
controlling charging power for a battery of the electronic device based on the heat state and the change in user contact area with the electronic device.

* * * * *